(12) United States Patent
Shih (10) Patent No.: US 8,837,934 B2
(45) Date of Patent: Sep. 16, 2014

(54) MONITORING CIRCUITRY FOR OPTICAL TRANSCEIVERS

(75) Inventor: Tien-Tsorng Shih, Taipei (TW)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 199 days.

(21) Appl. No.: 13/591,382

(22) Filed: Aug. 22, 2012

(65) Prior Publication Data

US 2013/0051789 A1 Feb. 28, 2013

Related U.S. Application Data

(60) Provisional application No. 61/528,923, filed on Aug. 30, 2011, provisional application No. 61/533,322, filed on Sep. 12, 2011.

(51) Int. Cl.
| | |
|---|---|
| H04B 10/08 | (2006.01) |
| H04B 17/00 | (2006.01) |
| H04B 10/00 | (2013.01) |
| H04B 10/40 | (2013.01) |

(52) U.S. Cl.
CPC .................................... H04B 10/40 (2013.01)
USPC ............... 398/16; 398/25; 398/135; 398/136; 398/137; 398/138

(58) Field of Classification Search
CPC ....................................................... H04B 10/40
USPC ....................................... 398/16, 25, 135–138
See application file for complete search history.

(56) References Cited

U.S. PATENT DOCUMENTS

| | | | | | |
|---|---|---|---|---|---|
| 4,545,078 | A | * | 10/1985 | Wiedeburg | .................... 398/166 |
| 4,687,924 | A | * | 8/1987 | Galvin et al. | ................. 250/216 |
| 5,278,404 | A | * | 1/1994 | Yeates | ........................ 250/214 C |
| 5,396,059 | A | * | 3/1995 | Yeates | ........................ 250/214 C |
| 5,526,160 | A | * | 6/1996 | Watanabe et al. | ............. 398/138 |
| 6,108,114 | A | * | 8/2000 | Gilliland et al. | .............. 398/195 |
| 6,198,118 | B1 | * | 3/2001 | Holcombe | ...................... 257/292 |
| 6,446,867 | B1 | * | 9/2002 | Sanchez | ....................... 235/454 |
| 6,512,617 | B1 | * | 1/2003 | Tanji et al. | .................... 398/137 |
| 6,556,330 | B2 | * | 4/2003 | Holcombe | .................... 398/202 |
| 7,079,775 | B2 | * | 7/2006 | Aronson et al. | .............. 398/137 |
| 7,184,668 | B2 | * | 2/2007 | Aronson et al. | .............. 398/137 |
| 7,215,891 | B1 | * | 5/2007 | Chiang et al. | ................. 398/137 |
| 7,286,762 | B2 | * | 10/2007 | Elahmadi et al. | ................ 398/77 |
| 7,295,750 | B2 | * | 11/2007 | Ekkizogloy et al. | .......... 385/147 |

(Continued)

FOREIGN PATENT DOCUMENTS

WO WO2006014414 2/2006

*Primary Examiner* — Ken Vanderpuye
*Assistant Examiner* — Abbas H Alagheband (57) ABSTRACT

Monitoring signals associated with operating parameters of an optical transceiver are ascertained by using a comparator arrangement external to a micro-controller unit. Monitoring signals associated with these operating parameter are provided as inputs to a discrete arrangement of comparators and then evaluated against a known reference voltage source. The reference source is swept across a known range of values, and when the output of the comparator changes state, the value of the reference input associated with this transition is defined as the value of the specific monitoring input signal and stored within the proper memory location within the microcontroller portion of the transceiver monitor circuit. The digital output signal of the comparator is applied as an input to the microcontroller, which recognizes this digital signal as defining the specific value of the reference signal to use and equate with the value of the monitored signal.

8 Claims, 8 Drawing Sheets

(56) References Cited

U.S. PATENT DOCUMENTS

| | | | |
|---|---|---|---|
| 7,302,186 B2* | 11/2007 | Light et al. | 398/137 |
| 7,302,192 B2* | 11/2007 | Elahmadi et al. | 398/190 |
| 7,502,564 B2* | 3/2009 | Aronson et al. | 398/137 |
| 7,668,512 B2* | 2/2010 | Woolf et al. | 455/67.11 |
| 7,715,731 B2* | 5/2010 | Elahmadi et al. | 398/189 |
| 7,802,124 B2* | 9/2010 | Dybsetter et al. | 713/500 |
| 7,881,608 B2* | 2/2011 | Miller et al. | 398/25 |
| 7,912,375 B2* | 3/2011 | Kondo et al. | 398/135 |
| 8,086,100 B2* | 12/2011 | Aronson et al. | 398/25 |
| 8,086,892 B2* | 12/2011 | Dybsetter et al. | 713/600 |
| 2002/0089729 A1* | 7/2002 | Holcombe | 359/189 |
| 2005/0031352 A1* | 2/2005 | Light et al. | 398/135 |
| 2006/0133813 A1* | 6/2006 | Ekkizogloy et al. | 398/135 |
| 2006/0245757 A1* | 11/2006 | Elahmadi et al. | 398/135 |
| 2006/0245758 A1* | 11/2006 | Elahmadi et al. | 398/135 |
| 2006/0245765 A1* | 11/2006 | Elahmadi et al. | 398/189 |
| 2008/0279566 A1* | 11/2008 | Miller et al. | 398/162 |
| 2008/0292311 A1* | 11/2008 | Daghighian et al. | 398/9 |
| 2008/0298810 A1* | 12/2008 | Crosby et al. | 398/135 |
| 2009/0138709 A1* | 5/2009 | Ekkizogloy et al. | 713/168 |
| 2009/0168858 A1* | 7/2009 | Luo | 375/224 |
| 2009/0226166 A1* | 9/2009 | Aronson et al. | 398/25 |
| 2009/0279885 A1* | 11/2009 | Kondo et al. | 398/25 |
| 2009/0279896 A1* | 11/2009 | Hufstedler et al. | 398/136 |
| 2010/0166431 A1* | 7/2010 | Wu et al. | 398/135 |
| 2010/0215359 A1* | 8/2010 | Li et al. | 398/22 |
| 2010/0254710 A1* | 10/2010 | Dybsetter et al. | 398/135 |

* cited by examiner

GIVEN Rx OPTICAL POWER=0.5mW, $I_{sig}$=0.5mA, THEN $V_{sig}$=0.5V
IF $V_{sig}>V_{ref}$, THEN $V_{comp}$=HIGH
IF $V_{sig}<V_{ref}$, THEN $V_{comp}$=LOW

| COUNT | MPU OUTPUT | DVR (KΩ) | $V_{ref}$ | $V_{comp}$ |
|---|---|---|---|---|
| 1 | 128 | 50.2 | 0.019604 | HIGH |
| 2 | 64 | 25.2 | 0.038824 | HIGH |
| 3 | 32 | 12.7 | 0.076154 | HIGH |
| 4 | 16 | 6.45 | 0.146667 | HIGH |
| 5 | 8 | 3.325 | 0.273103 | HIGH |
| 6 | 4 | 1.7625 | 0.48 | HIGH |
| 7 | 2 | 0.98125 | 0.772683 | LOW |
| 8 | 3 | 1.371875 | 0.59215 | LOW |

-->$I_{sig}$=0.48~0.7726mA, -->Rx OPTICAL POWER=0.48~0.7726mW

FIG. 9

$V_{cc}$=3.3V, R=0.3KΩ
GIVEN $V_{sig}$=0.5V, IF $V_{sig}>V_{ref}$, THEN COMPARATOR OUTPUT "HIGH" IF $V_{sig}<V_{ref}$, THEN COMPARATOR OUTPUT "LOW"

| COUNT | MPU OUTPUT | DVR-2 (KΩ) | $V_{ref}$ | $V_{comp}$ |
|---|---|---|---|---|
| 1 | 128 | 50.2 | 0.019604 | HIGH |
| 2 | 64 | 25.2 | 0.038824 | HIGH |
| 3 | 32 | 12.7 | 0.076154 | HIGH |
| 4 | 16 | 6.45 | 0.146667 | HIGH |
| 5 | 8 | 3.325 | 0.273103 | HIGH |
| 6 | 4 | 1.7625 | 0.48 | HIGH |
| 7 | 2 | 0.98125 | 0.772683 | LOW |
| 8 | 3 | 1.371875 | 0.59215 | LOW |

-->$V_{sig}$=0.48~0.59215V

FIG. 10

GIVEN $V_{sig}$=0.01V, IF $V_{sig}>V_{ref}$, THEN COMPARATOR OUTPUT "HIGH" IF $V_{sig}<V_{ref}$, THEN COMPARATOR OUTPUT "LOW"

| COUNT | MPU OUTPUT | DVR (KΩ) | $V_{ref}$ | $V_{comp}$ |
|---|---|---|---|---|
| 1 | 128 | 50.2 | 0.019604 | LOW |
| 2 | 192 | 75.2 | 0.013113 | LOW |
| 3 | 224 | 87.7 | 0.01125 | LOW |
| 4 | 240 | 93.95 | 0.010504 | LOW |
| 5 | 248 | 97.075 | 0.010167 | LOW |
| 6 | 252 | 98.6375 | 0.010006 | LOW |
| 7 | 254 | 99.41875 | 0.009928 | HIGH |
| 8 | 253 | 99.028125 | 0.009967 | LOW |

-->$V_{sig}$=0.009967~0.01V

MONITORING CIRCUITRY FOR OPTICAL TRANSCEIVERS

CROSS-REFERENCE TO RELATED APPLICATIONS

This application claims the benefit of U.S. Provisional Application No. 61/528,923, filed Aug. 30, 2011 and U.S. Provisional Application No. 61/533,322, filed Sep. 12, 2011, both of which are herein incorporated by reference.

TECHNICAL FIELD

The present invention relates to optical transceivers and, more particularly, to an arrangement that provides monitoring of various operating parameters associated with the performance of optical transceivers.

BACKGROUND OF THE INVENTION

Optical transceivers are used in optical communications systems to convert data signals from an electrical format into an optical format and vice versa. A typical optical transceiver comprises a number of separate optical, opto-electronic and electrical components, including a semiconductor laser diode (LD) or light emitting diode (LED) optical transmitting device, an electrical integrated circuit (IC) driver for providing the electrical data input to the optical transmitting device, an optical receiving device in the form of a P-I-N photodiode (PD) or avalanche photodiode (APD) and a transimpedance amplifier (TIA) for boosting the signal strength of the electrical version of the received optical signal.

The semiconductor laser is usually packaged together with a power monitoring photodiode and coupled to a lens system to form a transmitter optical subassembly (TOSA). The transmitter IC driver controls the laser operation and maintains a constant average laser output power through a feedback loop, while modulating the laser to convert electrical data signals into an optical data output signal. The feedback loop compensates for laser power changes as a result of, for example, laser aging, temperature variations, and the like.

The photodiode is usually packaged with a lens system to form a receiver optical subassembly (ROSA). The photodiode receives and converts an incoming optical data signal into electrical current, while the TIA converts the electrical current into an electrical voltage signal with linear amplification that faithfully represents the received optical data.

In most cases, it is desirable to monitor certain operational parameters of optical transceivers, such as laser bias current, laser average output power, average power (or optical modulation amplitude) as incoming at the receiver, power supply levels of the transceiver and transceiver temperature. Indeed, certain configurations of optical transceivers may require calibration or tuning of one or more of these parameters before the transceiver is able to properly be operated. Many prior art arrangements have been developed that perform this initial calibration and thereafter the "lifetime" operational monitoring of optical transceivers.

Figure 1:
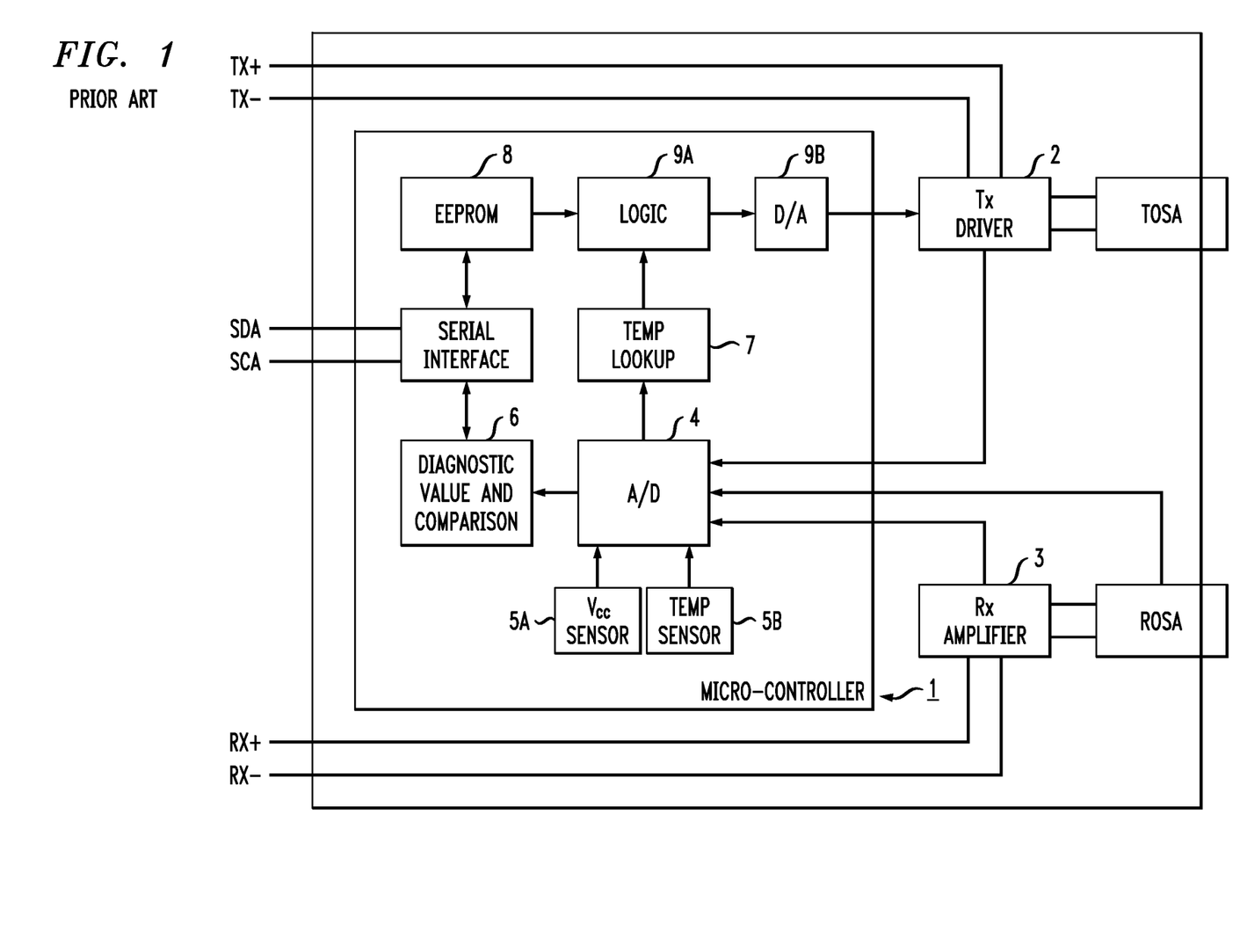
FIG. 1 illustrates a prior art transceiver monitor arrangement.

One prior art arrangement for performing calibration and monitoring is shown in FIG. 1. This arrangement utilizes a single integrated circuit in the form of a micro-controller (shown as micro-controller 1) to monitor and control all aspects of both a transmitter driver circuit 2 and a receiver TIA 3. In this prior art arrangement, an A/D converter 4 within micro-controller 1 accepts analog feedback signals from transmitter driver circuit 2 (bias, power) and receiver amplifier circuit 3 (RSSI). Analog control signals from a voltage source sensor 5A and a temperature sensor 5B formed as part of micro-controller 1 are also applied as inputs to A/D converter 4.

A/D converter 4 then creates digital versions of these monitor/control signals which are compared to digital values (and flags) stored in a diagnostic unit 6 and temperature lookup table 7. The results of the comparisons are thereafter stored in assigned locations within a memory 8 (the location assignments defined by industry standards). If any of the received digital monitor/control signal values falls outside of an acceptable range (recognized by comparison with the threshold values), this event is flagged and may also be used to trigger an adjustment of a related operating parameter of the transceiver (e.g., change the bias input to the laser, increase power of received signal via logic element 9A and D/A converter 9B output to transmitter driver 2).

While the arrangement as shown in FIG. 1 is useful, it is advisable in some instances to avoid the use of a single integrated circuit to perform all of the functions associated with optical transceiver monitoring. For example, measuring voltage supply levels and transceiver temperature readings within the micro-controller may result in inaccurate results (as compared to reading these values as co-located with the actual transmitter and receiver devices).

SUMMARY OF THE INVENTION

The needs remaining in the prior art are addressed by the present invention, which relates to a monitoring arrangement for optical transceivers and, more particularly, to an arrangement that provides monitoring of various transceiver components and operating conditions (hereinafter referred to as "operating parameters) by using separate, discrete modules to ascertain the values of these various operating parameters.

In accordance with the present invention, the specific values of various monitoring signals associated with operating parameters of an optical transceiver are ascertained by using a comparator module which is external to the micro-controller itself. These operating parameter monitor signals are provided as inputs to a discrete arrangement of comparator devices and then evaluated against a known reference voltage source (or current source, as the case may be). The output from the comparator module is applied as an operating parameter defined value to the micro-controller. In operation, the reference source is swept across a known range of values so that the comparator device is constantly comparing a changing reference signal against an (unknown value) operating parameter monitoring input signal. When the output of the comparator module changes state, the specific value of the reference input associated with this transition is defined as the value of the operating parameter being monitored and is thereafter stored within a proper memory location within a memory module of the micro-controller.

In one embodiment of the present invention, an analog reference signal created within the micro-controller is used as the reference source input to the comparator arrangement. In another embodiment of the present invention, a digital reference signal, in combination with a digital variable resistor arrangement in the comparator, is used in place of an analog reference voltage to perform the comparison operation.

Additionally, the arrangement of the present invention utilizes external voltage and temperature sensors to monitor these specific operating parameters. In the prior art, these sensors were integrated within the micro-controller integrated circuit. In accordance with the present invention, these sensors, which are coupled to the comparator module, may now be positioned at locations best-suited for their purposes.

For example, a temperature sensor may be located near the laser device, which is known to be sensitive to changes in temperature (and also generates a fair amount of heat during operation).

A specific embodiment of the present invention takes the form of an arrangement for monitoring and controlling a plurality of operating parameters associated with an optical transceiver that includes a micro-controller unit for generating a reference signal output and receiving as inputs digital control signals associated with the operating parameters of the optical transceiver, the micro-controller unit including a decision logic program module for controlling the value of the reference signal output and determining an assigned value of an operating parameter as equal to the output reference voltage when an associated input digital control signal changes state and a comparator module responsive to the reference signal output from the micro-controller unit and also responsive to a plurality of analog monitor signals, the comparator module for comparing the reference signal to each of the analog monitor signals and for generating a state transition output digital signal when the value of the reference signal approximates the value of an evaluated analog monitor signal, the state transition output digital signal applied as the digital control signal inputs to the micro-controller unit.

Other and further embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 2:
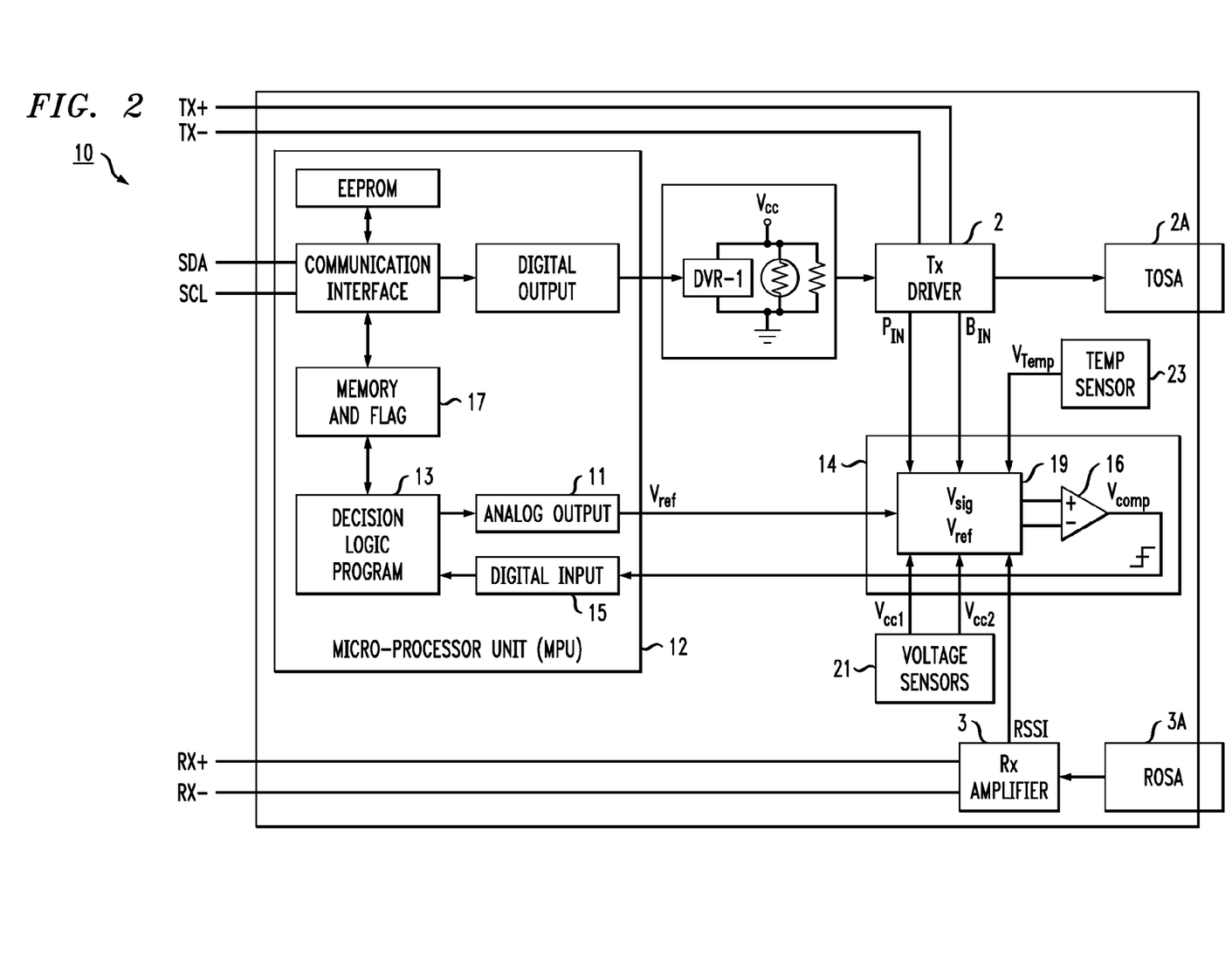
FIG. 2 illustrates an exemplary monitor arrangement of the present invention, using a microcontroller module and a separate comparator module.

FIG. 2 illustrates a monitor arrangement 10 formed in accordance with the present invention that may be used to determine and store values of various operating parameters associated with the performance of an optical transceiver. Similar to the arrangement of the prior art, monitor arrangement 10 is used to monitor transmitter driver circuit 2 (and associated transmitter optical subassembly 2A) and a receiver amplifier circuit 3 (and associated receiver optical subassembly 3A). Arrangement 10 is shown as comprising a micro-controller (MCU) 12 integrated circuit which operates in conjunction with a comparator module 14 to provide the desired functionality. As shown, comparator module 14 receives as inputs the various selected monitor signals that are desired to be initially tuned and/or thereafter monitored during the operation of a transceiver (these monitor signals typically defining various operating parameters of the transceiver). Current industry standards define a number of specific parameters that are to be monitored, namely: (1) the bias current applied to the laser device ($B_{IN}$); (2) the output power from the optical transmitter ($P_{IN}$); (3) the received signal strength indicator (RSSI) associated with the optical receiver; (4) transceiver power supply voltages $V_{cc1}$ and $V_{cc2}$; and (5) the temperature (T) of the transceiver. All of these parameters are represented as voltages during the comparison process; it is to be understood that current-based representations (or a mix of both voltage and current representations) may also be used. Moreover, these specific parameters should be considered as exemplary only; various other parameters (or subsets of parameters) may be monitored in accordance with the present invention.

As will be described in detail below, the present invention uses a separate and distinct comparator module to ascertain the value(s) of the operating parameters of a transceiver for both its initialization and later monitoring. The values of the operating parameters are ascertained by the comparator module performing a comparison of the "unknown" monitor signal against a known reference voltage $V_{ref}$ created by MCU 12. Referring to FIG. 2, reference voltage $V_{ref}$ from MCU 12 is applied as a first, reference input to comparator module 14. In the embodiment currently being discussed, $V_{ref}$ is presumed to be an analog signal. In an embodiment that will be discussed hereinbelow, a digital signal (D) is used as the reference output signal from MCU 12.

Returning to the discussion of the operating principles of the present invention, $V_{ref}$ is compared against the current (and unknown) values of selected operating parameters that are being monitored (hereinafter defined as "monitoring signals"), with the value of $V_{ref}$ "swept" along a range of possible values of a specific monitoring signal being evaluated. A decision logic program module 13 within MCU 12 is used to control the "sweeping" (incrementing or decrementing, as the case may be) which is used to change the value of $V_{ref}$ during the comparison process. In one example, the initial value of $V_{ref}$ is selected to be the maximum possible value of the associated monitoring signal. The sweeping then takes the form of a number of iterations (cycles) of comparison where the value of $V_{ref}$ is decremented a specific amount and compared against the unknown monitoring signal. As long as $V_{ref}$ remains greater than the value of the "unknown" input, the output of comparator module 14 will remain in the same state. As soon as $V_{ref}$ goes below the value of the unknown input, the output $V_{comp}$ of comparator module 14 changes state, sending this transition signal as an output back to digital input 15 of MCU 12. MCU 12, upon recognition of this transition, will use the current value of $V_{ref}$ as the "defined" value of the specific operating parameter associated with the monitoring signal being analyzed, storing this value in the proper location in memory 17 of MCU 12 in a conventional manner.

As shown, the operating parameters being monitored in this arrangement include the transmitter bias current and input power (noted as $B_{IN}$ and $P_{IN}$, respectively), which are applied as inputs to comparator module 14 from transmitter driver circuit 2. An RSSI signal from receiver amplifier 3 is also applied as an operating parameter input to comparator 14. Voltage signals associated with the power supplies of the transceiver are monitored by a voltage sensor 21 and applied as inputs $V_{cc1}$ and $V_{cc2}$ (in this example) to comparator module 14. A temperature sensor 23, in this case located in proximity of transmitter driver 2 and TOSA 2A, is used to monitor the temperature of the transceiver and provides a monitoring control signal input $V_{temp}$ indicative of the ambient temperature as an input to comparator module 14.

In the specific configuration of this embodiment as shown in FIG. 2, a single comparator 16 is used to perform the comparison operation within comparator module 14. As shown, comparator module 14 further comprises a multiplexing device 19 that is utilized to control the application of the different monitor/control signals described above to comparator 16 in a sequential manner.

Figure 3:
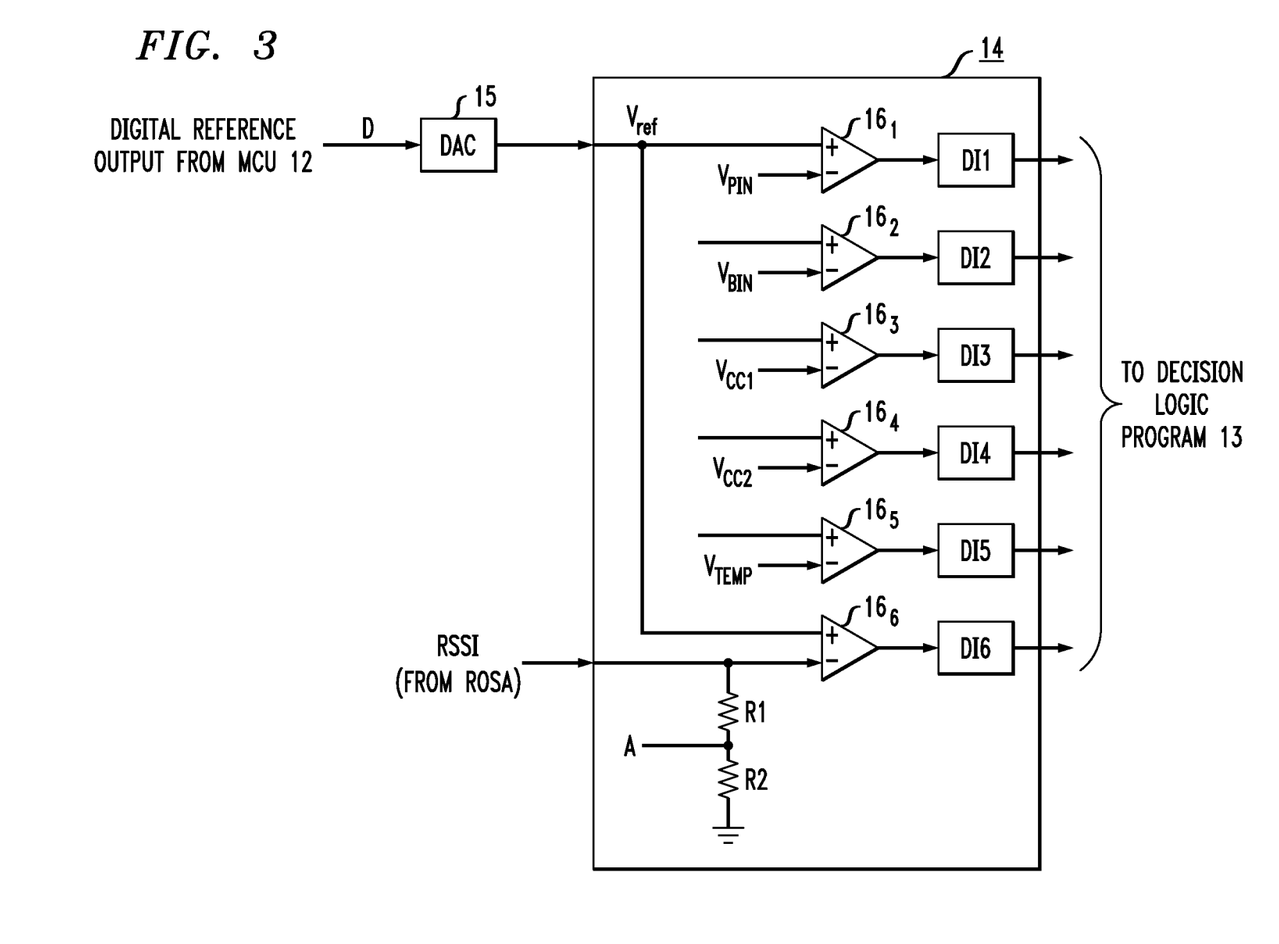
FIG. 3 is a detailed view of the comparator module portion of an exemplary arrangement of the present invention, utilizing a plurality of separate comparator devices within the comparator module.

While this specific configuration of FIG. 2 remains relatively compact in size, the time required to process and monitor each control signal is extended. An alternative configuration of this embodiment of the present invention may use a plurality of separate comparator devices in parallel within comparator module 14. FIG. 3 illustrates an exemplary embodiment of comparator module 14 for this alternative configuration, comprising a plurality of separate comparators $16_1$ through $16_N$ (N=6 in this specific arrangement). In this case, each monitoring signal is coupled as a dedicated input to its own specific comparator, with the separate outputs from the comparators thereafter applied as separate digital inputs DI1-DI6 to decision logic program 13 of MCU 12. While not specifically shown in this view, decision logic program 13 performs in the same manner as described above in association with FIG. 2 to ensure that the proper parameter values are stored within memory 17 of MCU 12.

More particularly, in this specific arrangement of comparison module 14 as shown in FIG. 3, the power output $P_{IN}$ from transmitter driver circuit 2 is applied as the unknown monitoring signal input to comparator $16_1$ and a voltage related to laser bias current $B_{IN}$ from driver circuit 2 is applied as the monitoring signal input to comparator $16_2$. The power supply voltages $V_{cc1}$ and $V_{cc2}$ from voltage sensor 21 are applied as monitoring signal inputs to comparators $16_3$ and $16_4$, respectively, and the voltage output $V_{temp}$ from temperature sensor 23 is applied as the monitoring signal input to comparator $16_5$. As also shown in FIG. 3, an RSSI signal from ROSA 3A is applied as a monitoring signal input to comparator $16_6$.

As described above, a known reference signal as $V_{ref}$ is created by MCU 12 and used to ascertain the value of the various unknown transceiver operating parameters as defined by their monitoring signals. In this particular embodiment, a digital reference signal D is provided as an output from MCU 12 and is thereafter converted into analog form within an external D/A converter 15. The created analog reference signal $V_{ref}$ is then directed into comparator module 14 and applied as an input to the plurality of comparators $16_1$-$16_6$. In operation and in the same manner as described above, the value of $V_{ref}$ is swept through a series of different values and compared against the "unknown" value of the monitoring signals. When the output from the comparator changes state, this is an "indicator" signal for MCU 12 to use the current value of $V_{ref}$ as the value of the specific monitoring signal being evaluated. For example, it can be presumed that the range of values for $V_{cc1}$ can be 3.3V±0.5V (thus, a range from 3.8V to 2.8V). In performing the comparison of the present invention, $V_{ref}$ is initially set equal to 3.8V and applied to the reference input of comparator $16_3$, with the actual power supply line of $V_{cc1}$ applied to the remaining input of comparator $16_3$. If the output of comparator $16_3$ does not change state, then it can be presumed that $V_{ref}$ is greater than the current value of $V_{cc1}$. $V_{ref}$ is then decremented a predetermined amount (perhaps 0.05V) and the comparison process is repeated. The process continues until the output of comparator $16_3$ changes state. For example, if the output changes state when $V_{ref}$=3.25V, this change of state signal (which is applied as digital input signal DI3 to MCU 12) will result in MCU 12 storing this current value 3.25V of $V_{ref}$ as the actual value of $V_{cc1}$.

A similar comparison operation is used to ascertain the actual value of each of the unknown monitoring signals—with updates to the values being made as time goes on. As particularly shown with respect to comparator $16_6$, the dynamic range used in reading the RSSI signal can be improved by using a two stage resistor network, shown as $R_1$ and $R_2$, where $R_1$<$R_2$. In situations where the RSSI signal is relatively large, node A between $R_1$ and $R_2$ is grounded, and only $R_1$ is used to create the RSSI voltage input to comparator $16_6$. Otherwise, if the RSSI signal is relatively weak, the resistance is increased by added $R_2$ to the network, thus increasing the dynamic range in reading the RSSI value.

Figure 4:
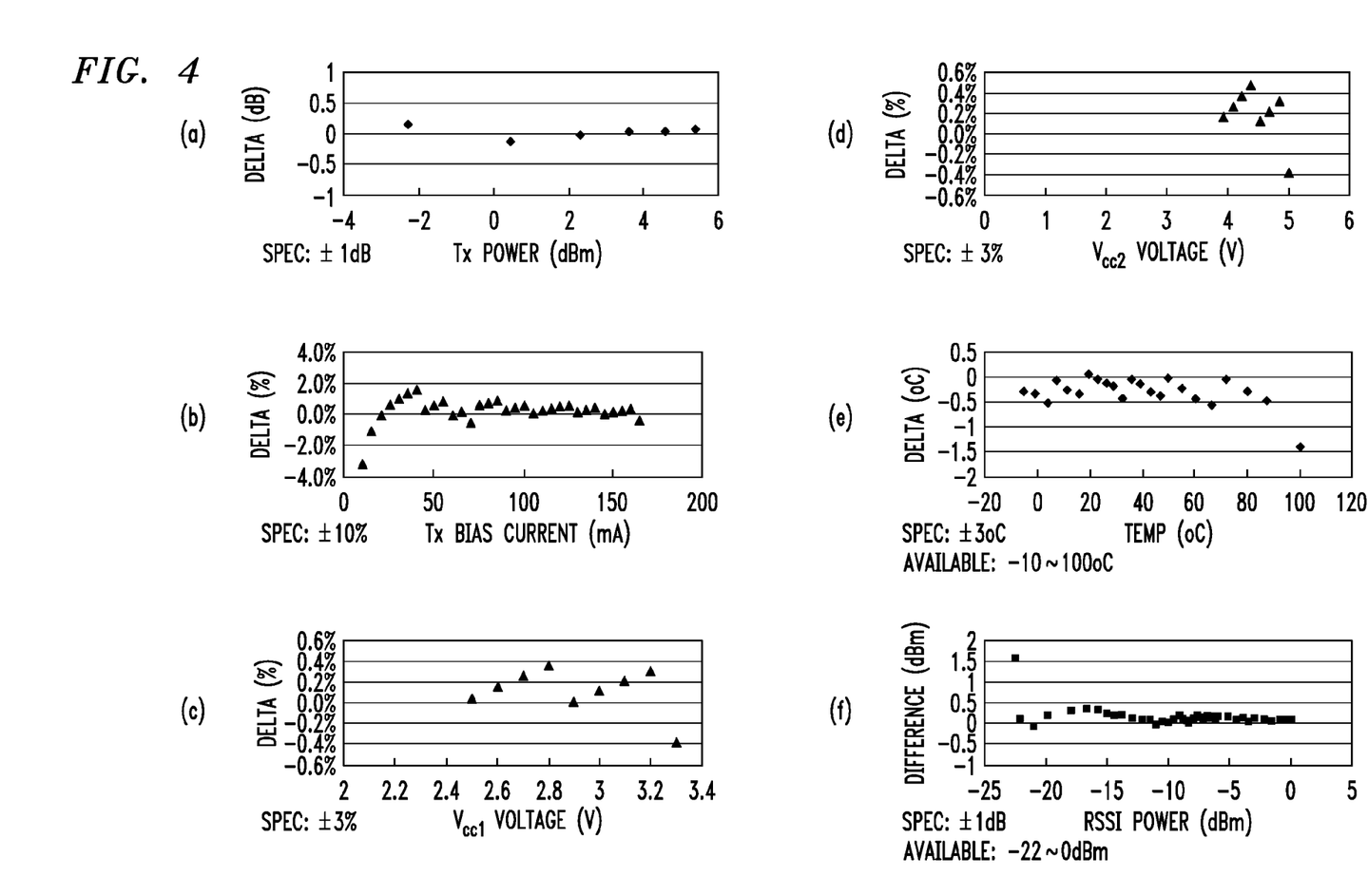
FIG. 4 contains a set of plots showing the capability of the arrangement of the present invention to accurately estimate the value of various operating parameters using the comparison process, with FIG. 4(a) associated with the transmitter power operating parameter, FIG. 4(b) associated with the transmitter bias current operating parameter, FIG. 4(c) associated with a first transceiver supply voltage operating parameter, FIG. 4(d) associated with a second transceiver supply voltage operating parameter, FIG. 4(e) associated with a transceiver temperature operating parameter, and FIG. 4(f) associated with a received power (received signal strength indication—RSSI) of the optical receiver.

FIG. 4 is a set of graphs illustrating the performance of the arrangement of the present invention as shown in FIG. 3. These graphs illustrate, for each one of the control/monitor signals, the accuracy of using the comparison process to determine the value of the monitoring signal. Each graph is a plot of a number of exemplary values of each parameter, as precisely measured by "outside" instrumentation. The y-axis represents the difference between the actual measured value and the "comparison" value obtained by the circuit of FIG. 3. In particular, the graph of FIG. 4(a) shows the difference between actual measured values and values generated using the comparison method of the present invention for the transmitted power level of the transmitter portion of an exemplary transceiver, the difference shown in terms of dBm. FIG. 4(b) illustrates the difference (displayed as % difference) between the actual, measured laser bias current value and the comparison-generated value of the present invention. Continuing in a similar fashion, FIG. 4(c) is associated with the measurement of supply voltage $V_{cc1}$, FIG. 4(d) is associated with the measurement of supply voltage $V_{cc2}$, FIG. 4(e) is associated with a measurement of the transceiver temperature, and FIG. 4(f) is a plot of the difference between the measured RSSI power and the comparator-generated value.

In particular, looking at the plot of transmitter power $P_{IN}$ depicted in FIG. 4(a), it is shown that when the actual power −2.3 dBm, there is a variation of only 0.1 dBm (meaning that the comparison arrangement "defined" the value as −2.2 dBm). Thus, on each graph it is presumed that the variations should be clustered around the 0 value if the comparison arrangement of the present invention is properly identifying the value of $V_{ref}$ that best matches the value of the monitor/control signal being evaluated.

Figure 5:
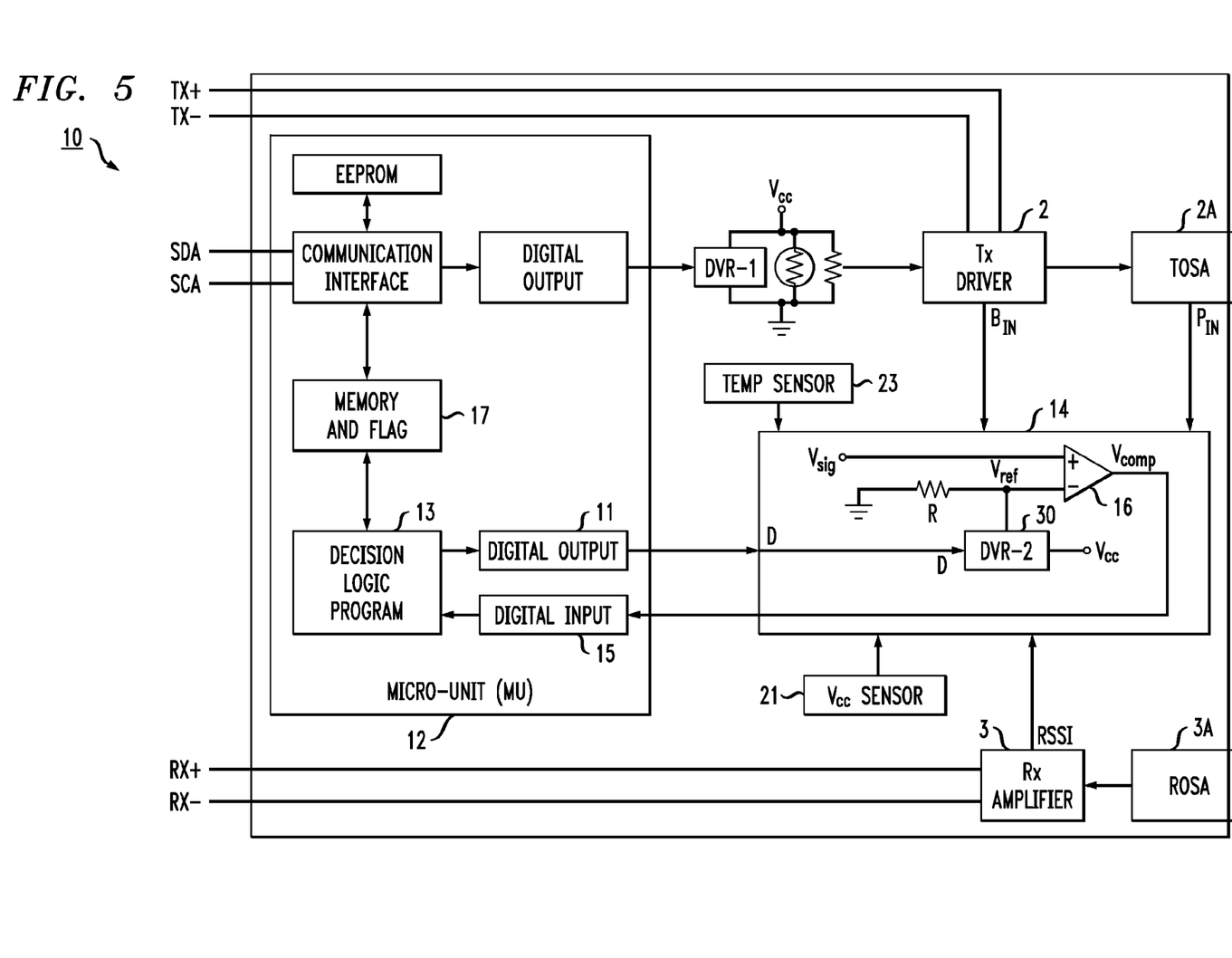
FIG. 5 illustrates an alternative embodiment of the present invention, in this case using a digital reference signal input to the comparator module to perform the comparison to the operating parameters by using a digital variable resistor (DVR) arrangement.

Instead of using an analog reference signal $V_{ref}$ to perform the comparisons within comparator module 14, it is also possible to use a digital reference output signal D from MCU 12 and an accompanying digital variable resistor arrangement to perform the comparison function. FIG. 5 illustrates an exemplary digital embodiment of monitor and control arrangement 10 of the present invention.

In accordance with this embodiment of the present invention, a digital output signal D from MCU 12 is applied as an input to comparator module 14. As shown, comparator module 14 includes a digital variable resistor (DVR) 30 that is used to generate reference voltage $V_{ref}$ as a function of digital input signal D. As explained in detail below, digital input signal D is adjusted in value so as to create the "sweeping" adjustments to the value of $V_{ref}$. In this embodiment, the (unknown) monitoring signal input is defined as an input voltage $V_{sig}$, where $V_{sig}$ and $V_{ref}$ are applied as separate inputs to comparator 16 within comparison module 14. For this particular configuration, as long as $V_{sig}$ remains greater than $V_{ref}$, the output from comparator 16 will be "high". When the value of $V_{ref}$ is adjusted to the point where $V_{sig}$ is less than $V_{ref}$, the value of comparator 16 will transition to its "low" state. When that occurs, the values are considered to be comparable, and the current value of $V_{ref}$ is presumed to be "near" the value of $V_{sig}$. As before, this state transition output from comparator 16 is then recognized by decision logic program 13 as defining the proper value of $V_{sig}$. Thus, without the use of A/D converters, the value of $V_{sig}$ is 'learned' and stored within memory 17 of MCU 12. This value is also compared against stored flag values and can be used to adjust one or more operating parameters of the associated transceiver. As noted above, $V_{sig}$ (or $I_{sig}$ in an alternative embodiment) is an input, "unknown" value associated with one of the parameters of the transceiver being evaluated.

Figure 6:
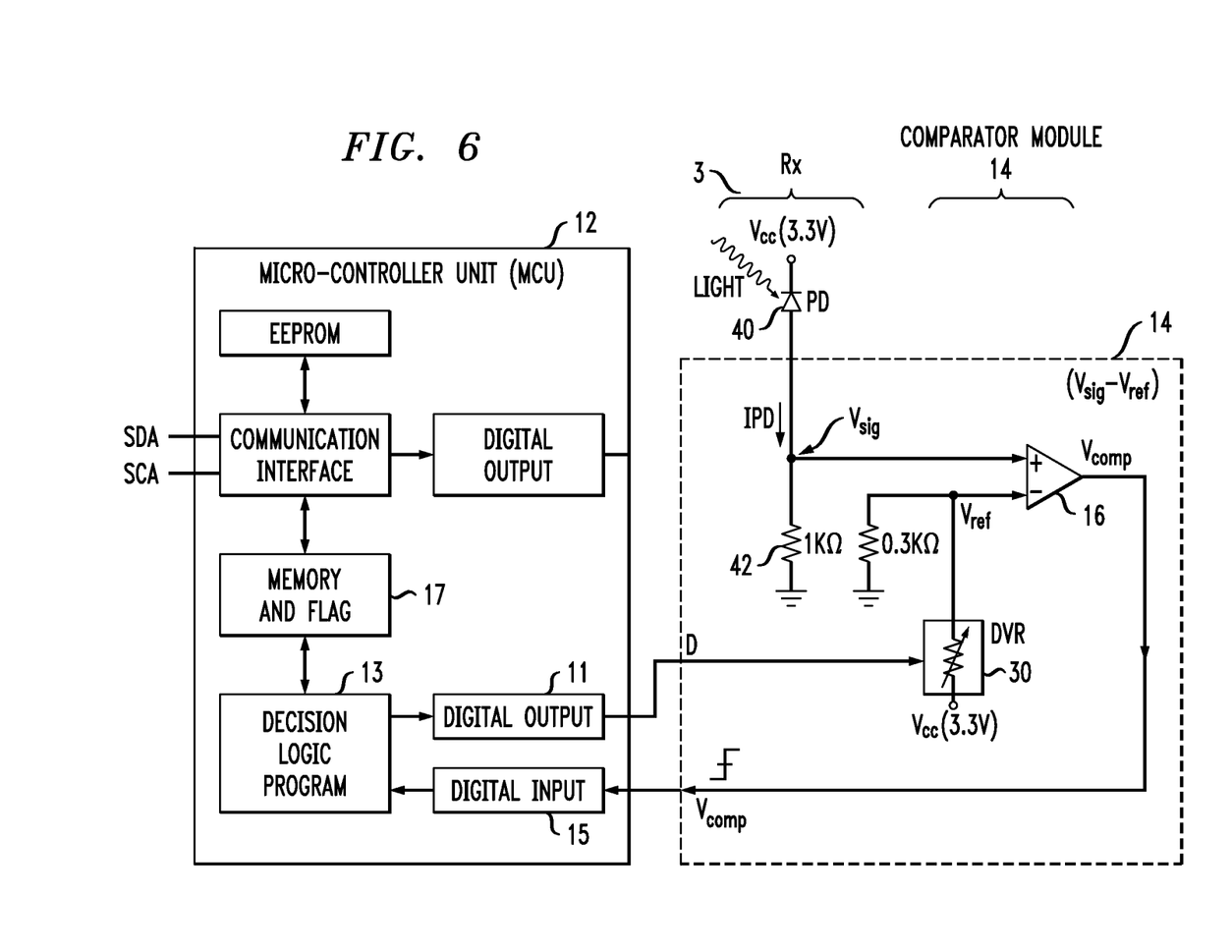
FIG. 6 is a detailed diagram illustrating the use of the arrangement of FIG. 5 to perform a comparison between the received signal power (RSSI) and a reference voltage created by the DVR.
Figure 7:
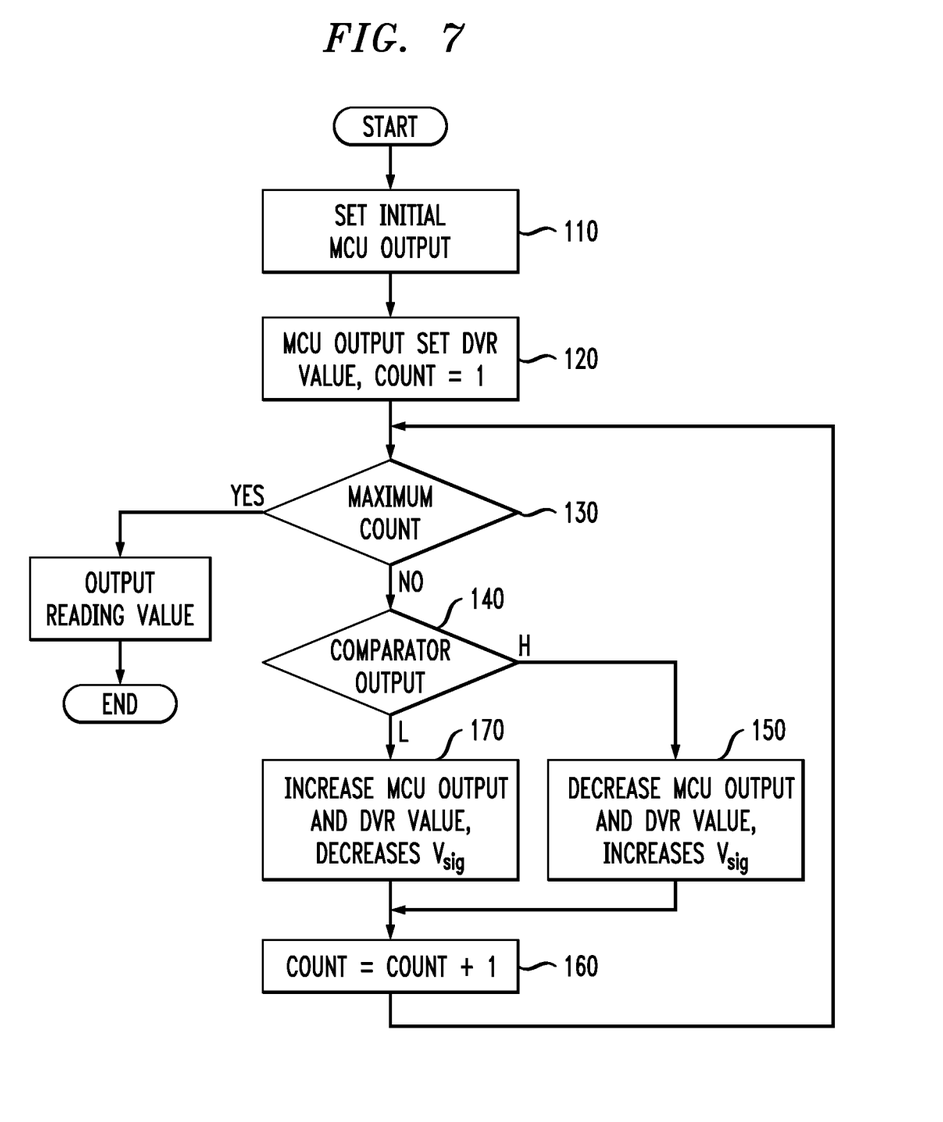
FIG. 7 is a flow chart showing a specific process that may be used in conjunction with the DVR embodiment of FIG. 5.

FIG. 6 illustrates the detailed operation of MCU 12 and comparator module 14 in this DVR embodiment, in this case used to determine the RSSI associated with receiver 3. As shown, the optical signal input to receiver 3 is applied as an input to a photodiode 40, creating an output photodiode current $I_{PD}$. The combination of photodiode 40 and a resistor 42 is used, in this particular embodiment, to create the $V_{sig}$ input that is to be determined using DVR 30 and comparator 16 in accordance with the present invention. An associated flow chart of the operation of these elements is shown in FIG. 7, and an exemplary table of resistor values as a function of the digital input value for an exemplary DVR device in shown in Table I below (considered to be just one example of a particular DVR device, and included for the purposes of aiding in the discussion of the operation of the DVR embodiment of the present invention).

TABLE I

| Digital output (8-bit) from MPU device | Resistance (in kΩ) |
| --- | --- |
| 0 (00000000) | 0.2 (minimum value) |
| 1 (00000001) | 0.591 |
| 2 (00000010) | 0.981 |
| 4 (00000100) | 1.763 |
| 8 (00001000) | 3.325 |
| 16 (00010000) | 6.45 |
| 32 (00100000) | 12.7 |
| 64 (01000000) | 25.2 |
| 128 (10000000) | 50.2 |
| 255 (11111111) | 99.809 |

Figure 8:
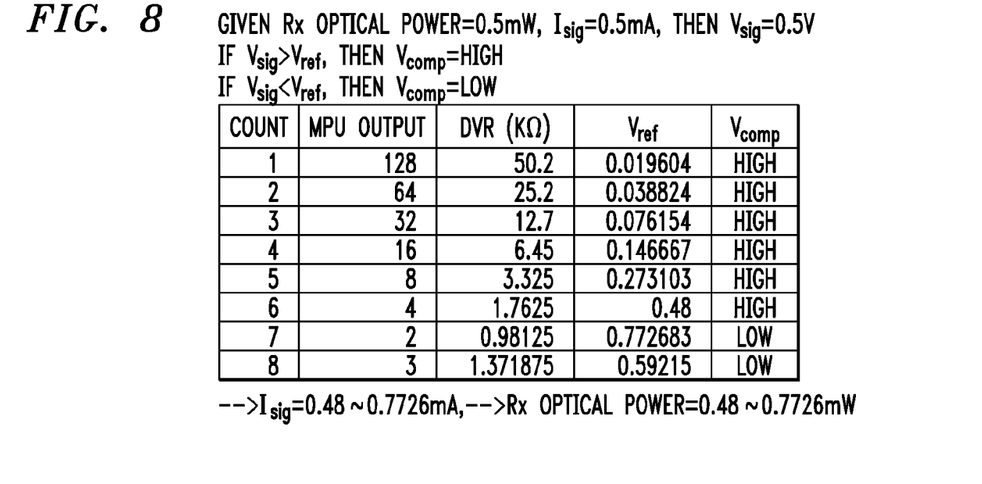
FIGS. 8-10 contain tables showing the incremental changes in DVR value as used to determine the proper value of an operating parameter being evaluated.

The process begins with MCU 12 transmitting an initial digital output signal D to DVR 30 to 'set' the first value of $V_{ref}$ (step 110). This signal is transmitted from MCU 12 to comparator module 14 and is applied as a digital input to DVR 30, setting the initial impedance value for DVR 30 (step 120). The initial "count" for the adjustment process is also set at this point to the value of "1". FIG. 8 contains a table showing the progression of the analysis of the process of using this DVR embodiment to perform monitoring and control of transceiver operating parameters in accordance with the present invention as the value of $V_{ref}$ is adjusted to ascertain the proper value for the unknown input signal $V_{sig}$. As shown for "count 1" in FIG. 8, the MCU digital output "128" is sent to DVR 30, setting the impedance value of DVR 30 to 50.2 kΩ. This selected value is considered exemplary; the initial impedance of DVR 30 can be set to any pre-defined value.

Referring back to the flowchart of FIG. 7, the current "count" value is compared to the maximum value (step 130). In this example, the maximum count value is 8, so the process continues to step 140, since the current value is only "1". At step 140, the output of comparator 18 is examined, where if $V_{sig} > V_{ref}$, the output will be "high"; if $V_{sig} < V_{ref}$, the output will be "low". With reference to FIG. 8, in this example the output of comparator 16 is found to be "high", thus $V_{sig}$ (while still unknown), is now known to be greater than $V_{ref}$ (which has a value of 0.019604 at the moment).

The adjustment of $V_{ref}$ occurs at this point in the process. Since the output of the comparison step is "high", the process moves to step 150, which decreases the output from MCU 12. This, in turn, decreases the resistance output from DVR 30 and increases the value of $V_{ref}$. Referring to FIG. 8, is it shown that this step increases $V_{ref}$ to a value of 0.038824. The count is then increased (step 160), and the process returns to the count comparison step 130.

The process continues in similar fashion, with the output of comparator 16 probed at each loop through the process. When the output from comparator 16 changes from "high" to "low" (which happens at count 7, in this example as shown in FIG. 8), this is a statement that $V_{sig}$ is now less than $V_{ref}$. In order to more accurately determine the proper value for $V_{ref}$, the process moves to step 170, which (slightly) increases the output from MCU 12 (in this case, to a value of 3). This will, in turn, slightly increase the resistance output from DVR 30 (from 0.98 to 1.37 kΩ) and slightly reduce the value of $V_{ref}$. The count is again increased (step 160), and the process is repeated. In this particular example, the output of comparator 16 remains low—the maximum count has been reached, and it is determined that the value of $V_{sig}$ is between 0.48V and 0.7726V (the pair of $V_{ref}$ values associated with the first state transition in the output from comparator 16).

Figure 9:
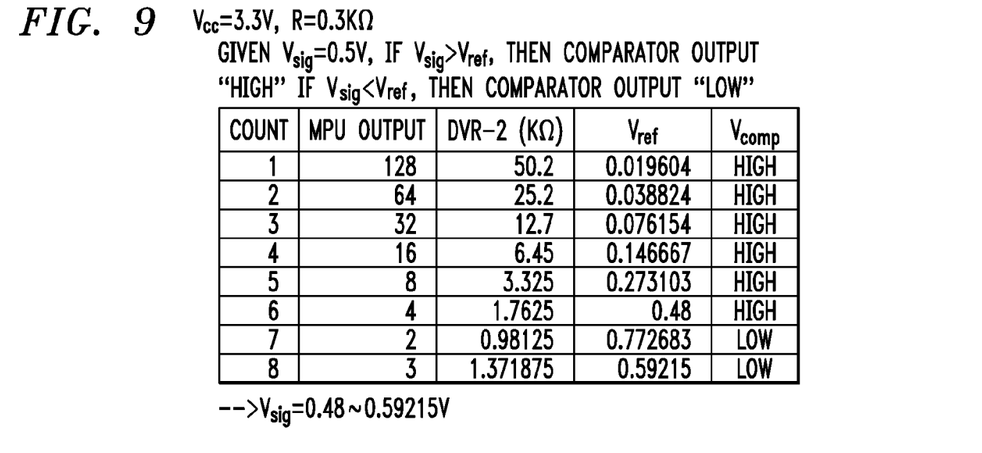
Figure 10:
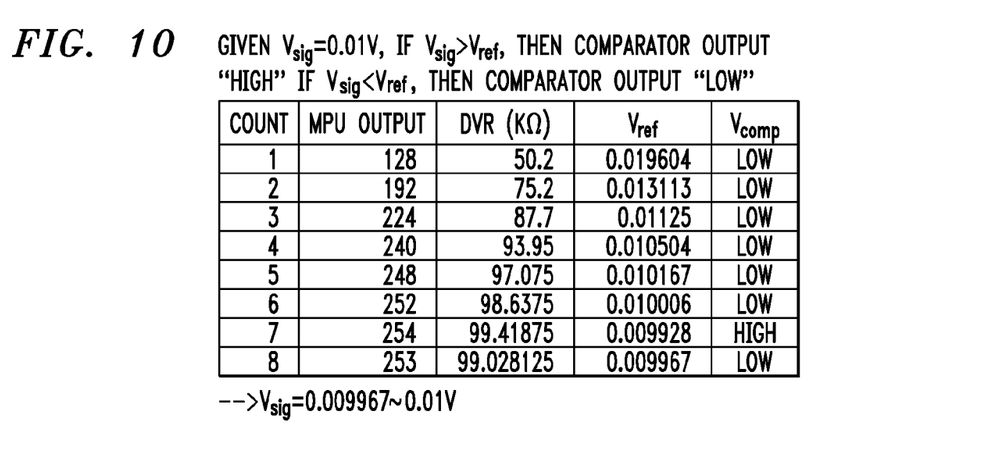

FIGS. 9 and 10 contain charts similar to FIG. 8, showing how the process of FIG. 7, through the adjustment of DVR 30 and use of comparator 16, can ascertain the values of the signals being studied.

While not explicitly shown, it is to be understood that a transceiver formed using the DVR-based monitoring arrangement of the present invention may use a plurality of DVR/comparator pairs (similar to the plurality of comparators as shown in FIG. 3), each to analyze the value of one of the parameters being studied (output power, DC bias level, temperature, etc.), each of these studied in the form of either an input current $I_{sig}$ or an input voltage $V_{sig}$. Alternatively, a single DVR/comparator pair may be utilized, and each of the desired signals measured at a different point in time. Either arrangement is considered to fall within the scope of the present invention.

Although specific embodiments have been illustrated and described herein for the purposes of explaining preferred embodiments, it will be appreciated by those of ordinary skill in the art that a wide variety of alternative and/or equivalent implementations can be derived that achieve the same purposes of the present invention in terms of utilizing only digital signal inputs to a transceiver micro-controller, in combination with using a separate and discrete modules for evaluating operating parameters of the transceiver in the form of a comparison module, voltage sensor module and temperature module. Therefore, it is intended that this invention be limited only by the scope of claims appended hereto.

What is claimed is:

1. An arrangement for monitoring a plurality of operating parameters associated with an optical transceiver including both an optical transmitter and an optical receiver, the arrangement comprising
    a micro-controller unit for generating a reference signal output and receiving an input digital control signal associated with a selected one of the operating parameters of the optical transceiver, the micro-controller unit including a decision logic program module for controlling a value of the reference signal output and determining an assigned value of an operating parameter as equal to an reference signal output voltage when the input digital control signal changes state; and
    a comparator module responsive to the reference signal output from the micro-controller unit and also responsive to a plurality of analog monitoring signals, the comparator module for comparing the reference signal output to a selected one of the plurality of analog monitoring signals and for generating a state transition output digital signal when the value of the reference signal output voltage approximates the value of the selected analog monitoring signal, the state transition output digital signal applied as the digital control signal inputs to the micro-controller unit.

2. The arrangement as defined in claim 1 wherein the arrangement further comprises a voltage sensing module for monitoring power supply signals applied to the optical transceiver and transmitting analog voltage representations of the monitored power supply signals as at least a portion of the plurality of analog monitoring signals applied as inputs to the comparator module.

3. The arrangement as defined in claim 1 wherein the arrangement further comprises a temperature sensor module for monitoring an ambient temperature of the optical transceiver and creating an analog output voltage signal related thereto, the output voltage signal from the temperature sensor module applied as an analog monitoring signal input to the comparator module.

4. The arrangement as defined in claim 1 wherein the reference signal output from the micro-controller unit is an analog voltage signal and the comparator module comprises at least one comparator device.

5. The arrangement as defined in claim 4 wherein the comparator module comprises a multiplexer and a comparator device, the multiplexer for receiving the plurality of analog monitoring signals and controlling the input, in turn, of the selected analog monitoring signal as an input to the comparator device.

6. The arrangement as defined in claim 4 wherein the comparator module comprises a plurality of separate comparator devices, with a separate analog monitoring signal applied as an input to a different one of the comparator devices, with the analog reference signal output applied as a remaining input to each comparator device.

7. The arrangement as defined in claim 1 wherein the reference signal output from the micro-controller unit is a digital signal and the comparator module includes a digital variable resistor arrangement for creating an analog reference signal therefrom for application as an input to the comparator device.

8. The arrangement as defined in claim 1 wherein the reference signal output from the micro-controller unit is a digital signal and the arrangement further comprises a digital-to-analog converter disposed between the micro-controller unit and the comparator module for converting the digital reference signal output from the micro-controller unit into an analog equivalent voltage reference to be applied as a reference input to the comparator module.

* * * * *